(No Model.)

J. T. CLARKSON.
TWO WHEELED VEHICLE.

No. 272,208. Patented Feb. 13, 1883.

Witnesses:
Eugene Humphrey
Henry H. Detteney

Inventor:
Joseph T. Clarkson
By Porter & Hutchinson Attys

UNITED STATES PATENT OFFICE.

JOSEPH T. CLARKSON, OF AMESBURY, MASSACHUSETTS.

TWO-WHEELED VEHICLE.

SPECIFICATION forming part of Letters Patent No. 272,208, dated February 13, 1883.

Application filed October 12, 1882. (No model.)

*To all whom it may concern:*

Be it known that I, JOSEPH T. CLARKSON, of Amesbury, State of Massachusetts, have invented an Improvement in Two-Wheeled Vehicles, of which the following is a specification.

This invention relates to vehicles which are provided with but a single pair of wheels, and especially to those which are supported upon springs directly secured to the axle, whereof the so-called "village cart" is a well-known type.

Figure 1:
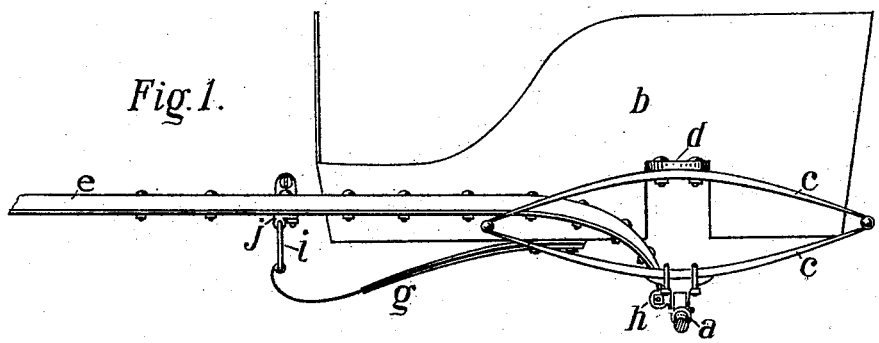
Figures 3, 5:
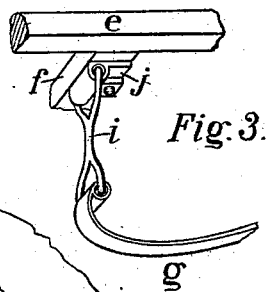
Figure 4:
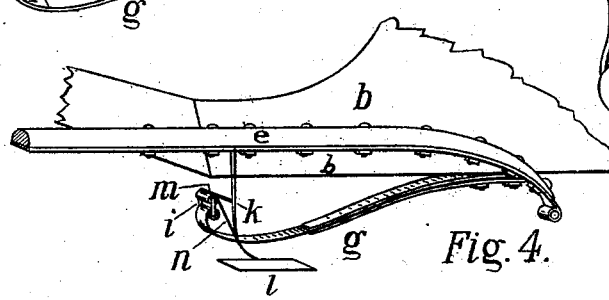
Figure 2:
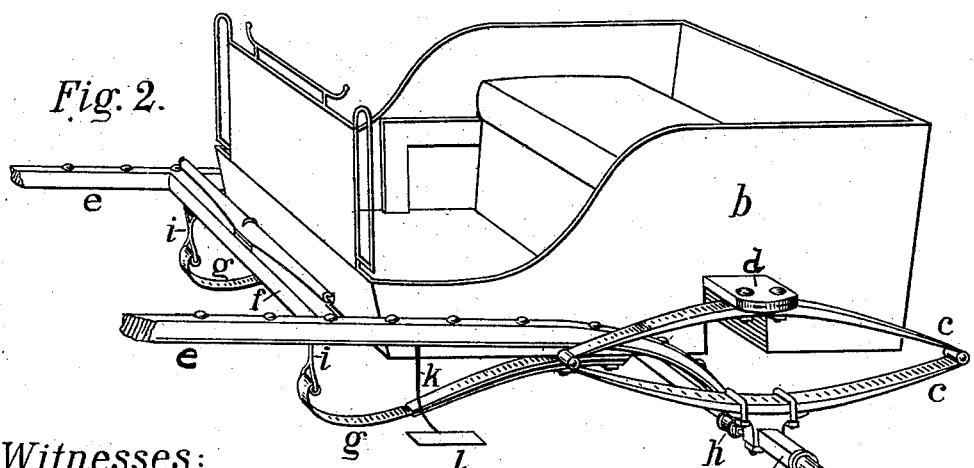

Figure 1 is a side elevation of a village cart embodying my improvement. Fig. 2 is a perspective view of the same. Fig. 3 is an enlarged detached perspective view, showing the connection of the arm-spring with the shafts through the cross-bar thereof. Fig. 4 is a view similar to Fig. 3, but showing the connection of the arm-spring with the body and its connection with the shafts through the steps secured to the same. Fig. 5 is a detached side elevation, showing the arm-spring.

In these views, $a$ represents the axle, and $b$ is the body, which is supported on the elliptic springs $c$ by cross-bar $d$, seated in the transverse axle-recess of the body in the well-known manner, said springs $c$ being clipped to axle $a$ in the usual manner, as shown.

The shafts $e$ $e$ are pivotally shackled to axle $a$, as shown at $h$, Figs. 1 and 2, in the usual manner of light four-wheeled vehicles.

For the purpose of affording the body an elastic yielding support in a horizontal position, or nearly so, yet allowing it free vertical play, and at the same time relieving it from the irregular motion imparted to the shafts by the motions of the horse thereto harnessed, I secure the thick rearward end of arm-springs $g$ rigidly beneath the side sills of the body, as shown in Figs. 1, 2, 4. The front attenuated ends of these springs are pivotally secured, either directly or indirectly, to shafts $e$. In Figs. 1, 2, 3 a link or stirrup, $i$, is shown as pivoted in the front end of spring $g$, and also pivoted in an eye-plate, $j$, secured to the shaft cross-bar $f$, while in Fig. 4 said link or stirrup $i$ is pivoted in an eye of arm $m$, projecting from shank $k$ of step $l$, secured to shaft $e$. As the strain upon the arm-springs $g$ is practically the same in an upward as in a downward movement of the front part of body $b$, said springs would be of entirely insufficient strength if the short or re-enforce leaves $v$ were in the usual manner arranged on one side of the pivotal or long leaf $p$. Therefore I place one or more (as the exigency demands) of the re-enforce leaves $v$ on each side of the pivotal leaf, and hence, whether the strain thereon be upward or downward, its resistance and strength are the same.

I am aware that heretofore a thin plate of elastic metal, bent to a compound curve, has been at one end bolted rigidly to the front portion of the body and at the other end rigidly secured to the shafts. Hence I do not claim, broadly, an elastic connection between the front of the body of a two-wheeled vehicle and the shafts. But I am, I believe, the first to pivotally connect the shafts of a two-wheeled vehicle, and also connect the body and shafts, by springs; and I am, I believe, the first to pivotally connect the front of the body in such vehicles with the shafts by means of springs.

It will be obvious that instead of securing arm-springs $g$ to body $a$ and pivoting them to the shafts, they may be secured to the shafts and pivotally connected with the body; but I prefer the former method.

I claim as my invention—

1. In a two-wheel vehicle, the body, axle, and intervening spring or springs, in combination with the shafts pivoted to the axle, and the arm-springs, one end of which is rigidly secured to the body and the other loosely connected to the shafts, whereby the motion of the latter in traveling is not conveyed to the body, as set forth.

2. In a two-wheel vehicle, the body $b$, axle $a$, and springs $c$, in combination with the shafts $e$, pivoted to the axle $a$, and the arm-springs $g$, having one end rigidly secured to the body $b$ and the other loosely connected to the shafts $e$, as and for the purpose set forth.

JOSEPH T. CLARKSON.

Witnesses:
T. W. PORTER,
HENRY H. LETTENEY.